US005739530A

United States Patent [19]

Franzen et al.

[11] Patent Number: 5,739,530

[45] Date of Patent: Apr. 14, 1998

[54] METHOD AND DEVICE FOR THE INTRODUCTION OF IONS INTO QUADRUPOLE ION TRAPS

[75] Inventors: Jochen Franzen, Bremen; Reemt-Holger Gabling, Stuhr; Yang Wang, Bremen, all of Germany

[73] Assignee: Bruker-Franzen Analytik GmbH, Bremen, Germany

[21] Appl. No.: 656,581

[22] Filed: May 31, 1996

[30] Foreign Application Priority Data

Jun. 2, 1995 [DE] Germany ........................ 195 20 319.4

[51] Int. Cl.[6] ............................ B01D 59/44; H01J 49/00

[52] U.S. Cl. .......................... 250/288; 250/282; 250/292

[58] Field of Search .................................... 250/281, 288, 250/292, 396 R, 282

[56] References Cited

U.S. PATENT DOCUMENTS 5,179,278 1/1993 Douglas .................................. 250/290
5,291,016 3/1994 Taya ........................................ 250/292
5,298,745 3/1994 Kernan .................................... 250/293
5,432,343 7/1995 Gulcicek ................................. 250/288
5,572,035 11/1996 Franzen .................................. 250/292
5,596,192 1/1997 Waki ....................................... 250/288

FOREIGN PATENT DOCUMENTS 0529885 3/1993 European Pat. Off. .
9523018 2/1995 WIPO .

*Primary Examiner*—Bruce Anderson

[57] ABSTRACT

The invention relates to methods and devices for the effective introduction of ions, which are stored in an RF ion guide into a quadrupole ion trap.

The invention consists of arranging a switchable ion lens between the RF ion guide and the quadrupole ion trap, and introducing the ions into the quadrupole ion trap by a suitable connection of the ion lens only during the filling period, while otherwise the ions are reflected back into the RF ion guide. The filling period can be divided up and limited to the capture intervals of the quadrupole ion trap during each RF period. Measurement of the filling rate can be made by switching open the ion lens longer then the admission interval of the quadrupole ion trap, and measuring the flow of the ions passing through on the detector.

17 Claims, 3 Drawing Sheets

METHOD AND DEVICE FOR THE INTRODUCTION OF IONS INTO QUADRUPOLE ION TRAPS

The invention relates to methods and devices for the effective introduction of ions, which are stored in an RF ion guide into a quadrupole ion trap.

The invention consists of arranging a switchable ion lens between the RF ion guide and the quadrupole ion trap, and introducing the ions into the quadrupole ion trap by a suitable connection of the ion lens only during the filling period, while otherwise the ions are reflected back into the RF ion guide. The filling period can be divided up and limited to the capture intervals of the quadrupole ion trap during each RF period. Measurement of the filling rate can be made by switching open the ion lens longer then the admission interval of the quadrupole ion trap, and measuring the flow of the ions passing through on the detector.

PRIOR ART

Mass spectrometric methods are penetrating into more and more fields of application as universal analysis tools. Mass spectrometry has the disadvantage, in contrast to some other types of spectroscopy, of being a substance-consuming analytic method.

The introduction of mass spectrometric methods in biochemistry, particularly in genetic and protein research, is still impeded by the high substance consumption of these methods. In order to receive mass spectrometric information with just a few attomols of a substance (1 attomol=600,000 molecules), it is necessary to reduce substance consumption and ion losses in all phases, from ion generation to ion measurement, to a minimum. The yield from each phase must be optimized.

Temporary storage of ions in an RF ion guide in front of the quadrupole ion trap is a major advancement relative to this optimization. As described in patent application U.S. Pat. No. 5,179,278 (EP 0 529 885 A1), it is possible to temporarily store ions from a continuously operating ion trap in such a way that the quadrupole ion trap is charged with ions within only a relatively brief filling time, while the ions are temporarily stored during the prolonged analysis period in the quadrupole rod system used as ion guide. In particular, it is possible the ions in the RF ion guide can be slowed down to thermal energies ("thermalized"), which improves their capture in the quadrupole ion trap. The RF ion guide need not be a quadrpole system, any cylindrically arranged system of parallel rods to which phases of an RF voltage are fed can be alternately applied. For this, hexapole and octopole systems have proven successful in addition to the quadrupole. However, even pentapole or heptapole systems can be used which are operated with five-phase of seven-phase rotational RF voltage. The more, even other forms or cylindrical or conical RF ion guides have become known.

A critical phase has always been and continues to be the introduction of ions from the RF ion guide into the quadrupole ion trap. Until now, little has been known about the capturing process of the ions in the quadrupole ion trap. Own investigations, including both experiments on ion traps and computer simulations, have indicated that ions can only be captured in a very brief interval of only a few percent of the entire period of RF. The length of the capturing period is dependent on the injection energy of the ions and the pressure of the collision gas in the ion trap. In the remaining period, the ions are either scattered by reflection at the entrance to the quadrupole ion trap, or however—in almost 50% of the remaining time—are accelerated within the ion trap toward the end cap facing the entrance and are therefore no longer of use.

To prevent ions to enter the ion trap outside the filling period, the mid-potential of the ion guide can be changed so that ions can no longer enter the trap. However, it is disadvantageous to have to switch the mid-potential of the RF ion guide in order to fill the quadrupole ion trap. The field throughput from the quadrupole ion trap through the ion injection hole is very strong during scanning, therefore the change of the mid-potential must be significantly strong. Temporary storage is only successful if the mid-potential of the RF ion guide is greatly decreased. For electronic reasons, the mid-potential cannot be switched infinitely fast—not in a few nanoseconds.

Further, no method is known by which filling rate can be measured and controlled during filling.

OBJECTIVE OF THE INVENTION

A method and a device must be found with which ions can be transferred from an RF ion guide into an RF ion trap without needing to switch the mid-potential of the RF ion guide. The transfer should maximize yield and minimize ion losses. The filling rate ought to be able to be measured during filling if possible, in order to ensure an optimal filling of the quadrupole ion trap with ions.

IDEA OF THE INVENTION

It is the basic idea of the invention to introduce a switchable ion lens between the RF ion guide and the quadrupole ion trap in order to avoid switching the mid-potential of the ion guide.

It is a further basic idea of the invention to inject the ions into the quadrupole ion trap only during the capture interval of the RF period. Ions should be admitted to the quadrupole ion trap only under injection conditions favorable for capture in the ion trap. In the time remaining which is not used for filling the ion trap, the lens should reflect the ions back without losses into the RF ion guide. Opening of the lens can be repeated during any period of RF voltage under these operating conditions, or however, if slower filling is desirable, be limited to every $n^{th}$ RF interval. In this way, ion losses are minimized. When using every RF interval, the quadrupole ion trap is at least filled at the same rate as without a switchable lens, since filling is only interrupted during the times when the ions are lost. However, since the switchable lens injects the ions before the point in time when there is a suctioning field in the quadrupole ion trap, filling proceeds even faster when using the ion lens.

The quadrupole ion trap only works well as a mass spectrometer if the ion number is limited, because otherwise space charge effects impair the function. The optimal filling time for the quadrupole ion trap is very dependent however on the number of stored ions in the RF ion guide. It can amount to—when using the previous method of constant filling—several microseconds, or even several hundred milliseconds. At an RF of about 1 megahertz for the quadrupole ion trap, this could be a few RF intervals, or even several hundred thousands RF intervals. Since the optimal filling is about $10^4$ ions, filling can proceed at 1,000 ions per capture interval in 10 intervals, or at only 0.1 ion per capture interval in 100,000 intervals.

It is a further basic idea of the invention to also implement the ion lens for the measurement of filling rate. If the ion lens is opened within the second half phase of RF voltage of the quadrupole ion trap for a brief time, the ions are accelerated toward the end cap facing the entrance and exit through its holes, as far as these are hit. The emerging ion stream can be measured on the ion detector. From this ion current, the filling rate can be determined, and from this the number of filling phases (capture intervals) for an optimal filling. It becomes apparent from the above consideration that measurement cannot be completed within one single opening interval, but must rather—like the filling—be repeated frequently, and averaged. Since this measurement may take a long time, it can even be done during the filling, by opening the ion lens for measurement in addition to opening it for the filling. From several such measurements during filling, a change in the filling rate—perhaps due to an increase of ions in the RF ion guide caused, e.g., by arrival of substance ions from a capillary electrophoresis peak—can be recognized and corrected.

In the RF ion guide, the ions can be easily slowed down to thermal energies by the application of collision gas. They are then located in a minute, thread-shape area along the axis of the guide. Their potential is equal to the mid-voltage of the RF ion guide. This potential should be favorably kept between several tenths of a volt and several volts above the mid-potential of the quadrupole ion trap. Since the ions are thermalized in the ion guide, the ion lens requires a high voltage of far more than 100 volts in order to switch the admission on or off sufficiently fast, and to accelerate the ions within the brief period of time against their inertia into the ion trap. Switching off the ion lens must therefore be extremely fast. The capture intervals are only about 30 to 150 nanoseconds long, indicated for a quadrupole ion trap RF of 1 megahertz. The rise time for this switching potential must therefore be at least 1,000 volts per microsecond, or even much more if possible. The voltage supply is best activated by a quartz control pulse which provides the basic pulse rate for the RF drive voltage of the quadrupole ion trap, as well as the switching pulse rate for the switchable lens. The most favorable switching times and switching phases are best determined by experiment.

Even with high voltages at the center aperture diaphragm of the lens, the access time of ions into the ion lens, and the transfer time of ions into the ion trap is not insignificant. Transfer time must be relatively short compared to the length of the capture interval, and must be taken into consideration in designing the electronics circuitry. Transfer time is also mass dependent. This type of filling is therefore most appropriate if the masses of the ions being fed into the ion trap are not very different. Limitation to one mass range which does not exceed a factor of two between the lightest and heaviest mass is optimal.

Most favorable is an ion lens made up of three coaxial apertures, from which the third aperture is formed by the end cap of the quadrupole ion trap itself. In order to keep the transfer time short, the distances between the aperture diaphragms should be very small.

The ions are drawn in by a potential throughput of the center aperture through the first aperture of the RF ion guide, and accelerated. With this acceleration, they are injected (in the most favorable type of injection) in an RF phase where there is still a weak repelling but decreasing field inside the ion trap. Running up against this weak remaining field, they soon come to rest after their admission, at about the time that the RF potential sweeps through zero. They are then consequently captured by the RF field and oscillate within the quadrupole ion trap at the secular frequency characteristic of them.

The quadrupole ion trap can theoretically be filled even faster. To do this it is necessary to open the capture interval somewhat earlier and to inject the ions with somewhat higher energy at the beginning of the capture interval. This requires a variable injection energy which is adjusted by the mid-potential of the RF ion guide relative to the end cap of the quadrupole ion trap. However, this change is technically not easy to realize.

An temporary increase of collision gas pressure inside the ion trap can improve capture. This method is technically much simpler and is more easily realizable. A higher collision gas pressure extends the operating interval at both the beginning and the end of the acceptance interval, since ions slightly accelerated in the lens field or ion trap field can still be slowed down. The collision gas pressure must drop down again after filling for optimal operation of the quadrupole ion trap as a mass spectrometer, or else the mass resolution will suffer.

It has proven useful to also provide the first aperture of the ion lens with a voltage supply. In this way, an optimal reflection of the ions can be set at this end of the RF ion guide, without needing to lower the mid-potential of the RF ion guide.

FURTHER ADVANTAGES OF THE INVENTION

The ion lens has further advantages.

The ion detector is much less overloaded in comparison with the formerly predominant filling operation. If filling is not switched off during the second half phase of RF, the ions within the quadrupole ion trap will be accelerated toward the counterelectrode. Most of these ions escape through the outlet holes and move to the ion detector which is greatly overloaded at this time, and damage might occur. Protective mechanisms which are sometimes installed to prevent overloading are rendered unnecessary with this invention.

The suctioning throughput of the field out of the quadrupole ion trap into the RF ion guide during mass scanning is avoided. During mass scanning, the RF voltage is driven to its upper limit. There is a field in excess of 500 volts per centimeter for the ions at the injection hole which can reach through the hole into the RF ion guide. It was therefore necessary to set the mid-potential of the RF ion guide sufficiently low during scanning time for the ions not to be drawn into the quadrupole ion trap at the end of scanning, generating a strong background signal. The ion lens prevents this throughput very effectively, the mid-potential can also remain adjusted in the way required for an optimal capture ions in the quadrupole trap.

BRIEF DESCRIPTION OF THE DRAWING

FIG. 1 shows the window for ion capture (top) over the phase of the RF voltage (bottom) for the quadrupole ion trap. The RF voltage is plotted in such a way that it corresponds to the electrical field at the end cap electrode. In the first half period from zero to π, there is a reverse field in the ion trap at the location of the injection for positive ions. Ions which are injected into the quadrupole ion trap with little initial energy are best captured if they experience an only very weak, continuously declining opposing field which slows them down. The deceleration is most favorable if the ion comes to rest exactly when the RF voltage, and therefore also the field, have their zero sweep. The ions must therefore be injected just before the zero sweep. In this case they are even captured without the presence of a collision gas, however constantly maintaining their secular oscillation with a very large amplitude.

For ions with a somewhat higher initial energy, the capture interval is adjusted to somewhat earlier phase values, but is also narrower. The capture interval can also be artificially widened, by first injecting ions with slightly higher kinetic energy, then those with lower energy.

An increased collision gas pressure also widens the capture interval and the end of the interval is then shifted beyond the value of π. The indicated capture interval of 0.95 π to 1.01 π is valid for ions with a kinetic energy of about 0.5 to 1 eV and for a normal collision gas pressure, as is necessary to operate a quadrupole ion trap as a mass spectrometer.

Figure 1:
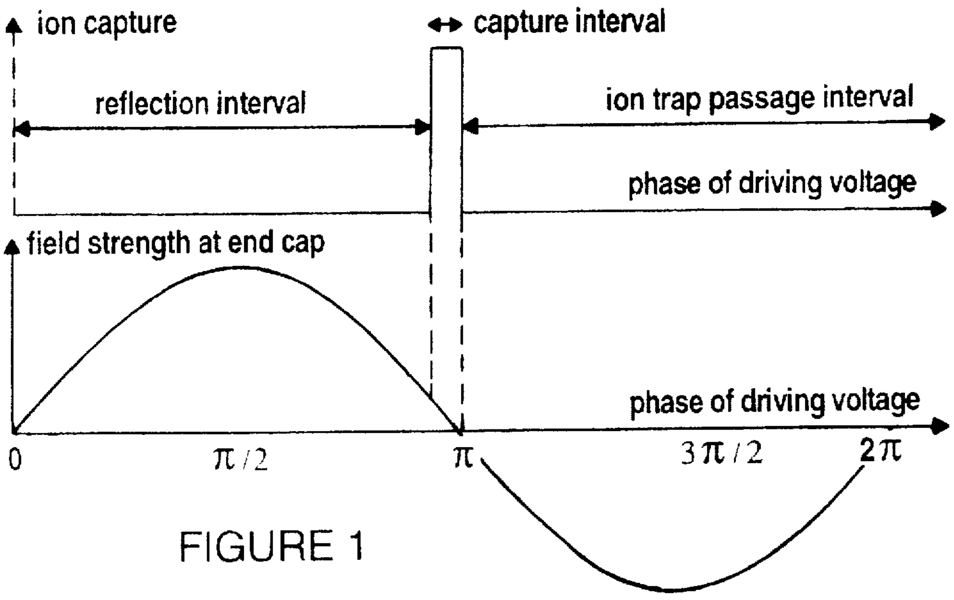
FIG. 1 is a plot of field strength at the end cap versus the phase of the driving voltage which shows the window for ion capture (top) over the phase of the RF voltage (bottom) for the quadrupole ion trap.
Figure 2:
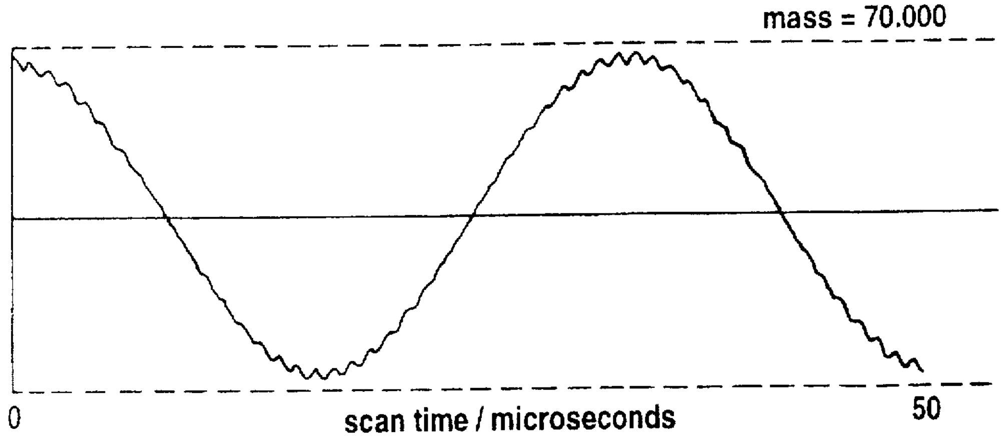
FIG. 2 is a plot of scan time in microseconds versus ion mass and illustrates a case of favorable injection.

FIG. 2 shows the case of favorable injection. The movement of an ion in the z axis is shown as a function of time. The ion was injected at zero-time from above with a low kinetic energy of 0.7 eV at the RF phase of 0.97 π in such a way that it came to rest through the low opposing field within the ion trap exactly at the moment when the RF voltage had its zero sweep. The drive voltage frequency here amounts to 1 MHz, visible as a small, impressed oscillation. The secular frequency for this ion of 70 atomic mass units here amounts to 40 kHz, so that on a scale with 50 microseconds, two complete periods of secular oscillation are visible. In the presence of a collision gas, the ion would then be slowed down, dependent on the collision as pressure, in about 100 to 10,000 oscillations, so that it would come to rest at the center of the ion trap.

Figure 3:
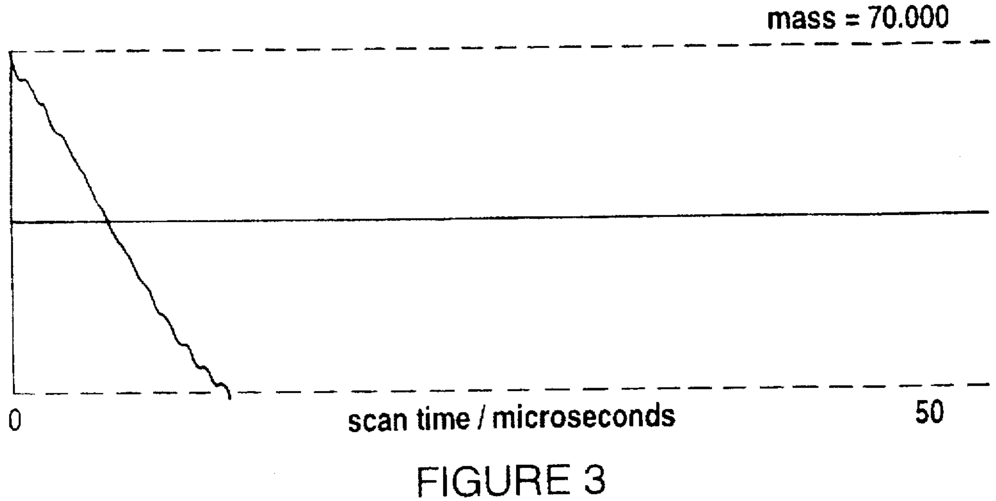
FIG. 3 is a plot of scan time in microseconds versus ion mass and shows the injection of an ion at a phase of 1.1 $\pi$, but otherwise illustrates the same conditions as show in FIG. 2.

FIG. 3 shows the injection of the ion at the phase of 1.1 π, but otherwise the same conditions as in FIG. 2. The accelerated ion flies through the ion trap. The passage of ions through the ion trap in this phase can be used for the measurement of filling rate.

Figure 4:
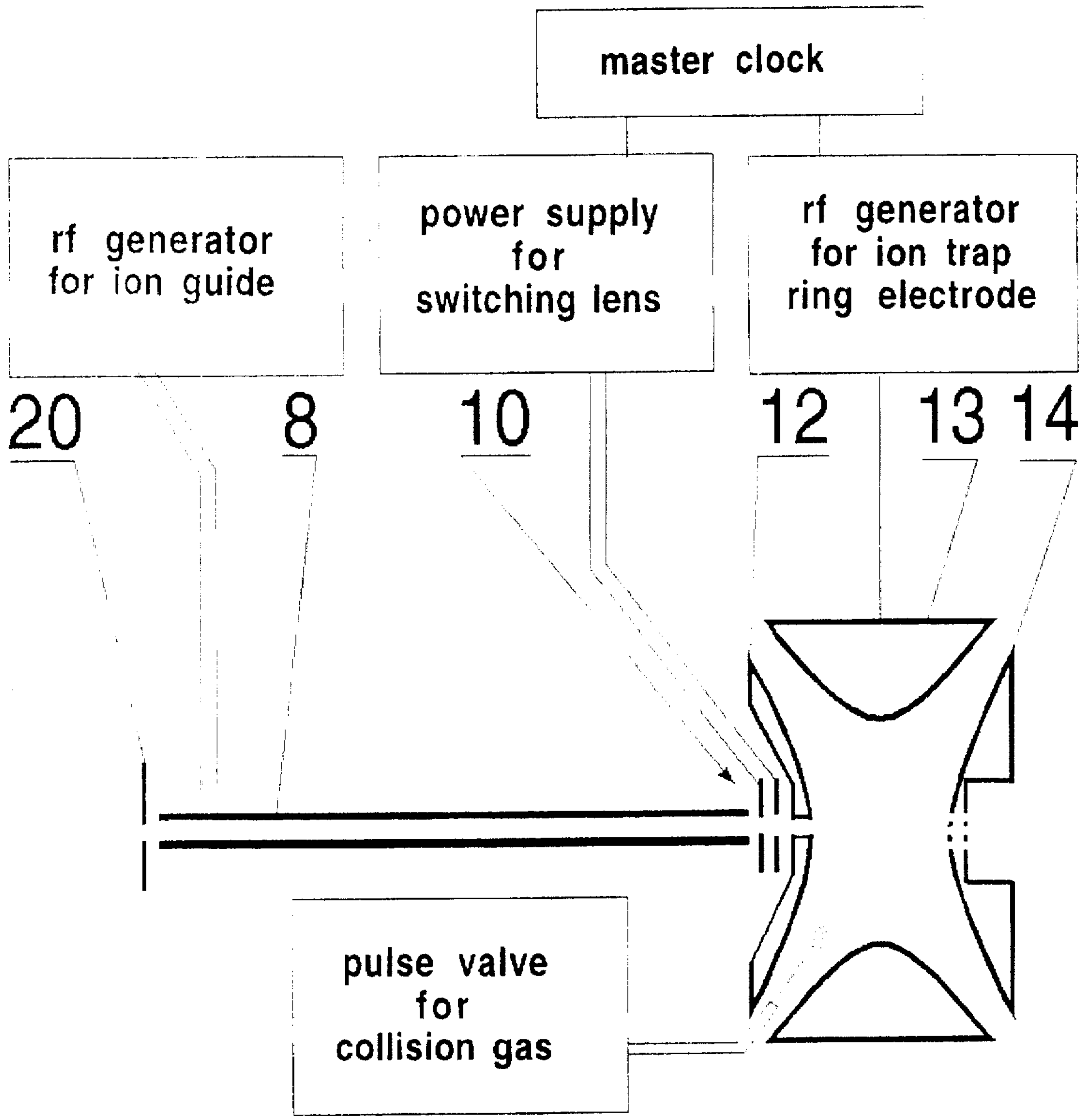
FIG. 4 is a block schematic diagram of a switchable three aperture ion lens located between the RF ion guide and the quadrupole ion trap.

FIG. 4 shows the switchable, three-aperture ion lens (10) between the RF ion guide (8) and the quadrupole ion trap, which consists of a first end cap (12), ting electrode (13) and second end cap (14). The RF ion guide (8) is reflectingly terminated at the beginning by an aperture (20), and at the end by the lens (10) for the enclosed ions. The ion lens (10) consists of two aperture diaphragms and the end cap (12) of the ion trap, which forms the third aperture of an Einzel lens. Using a voltage on the middle electrode of the ion lens (10), the lens can be switched to passage or reflection. The potential of the first aperture of the ion lens (10) is also adjustable, this potential being responsible for the reflection of the ions. The mid-potential of the RF ion guide (8) is at a value which lies between several tenths of a volt to several volts above that of the end cap (12), so that the ions are able to proceed into the ion trap during lens flight. According to the invention, the flight is limited to the times of ion capture in the ion trap. The injection energy of the ions is determined by the mid-potential of the RF ion guide (8) relative to the voltage of the end cap (12).

By pulsing the supply of a collision gas into the quadrupole trap (12, 13, 14), capture can again be improved. If the capture interval then becomes broader, the ion lens must also therefore be switched correspondingly longer to passage.

Figure 5:
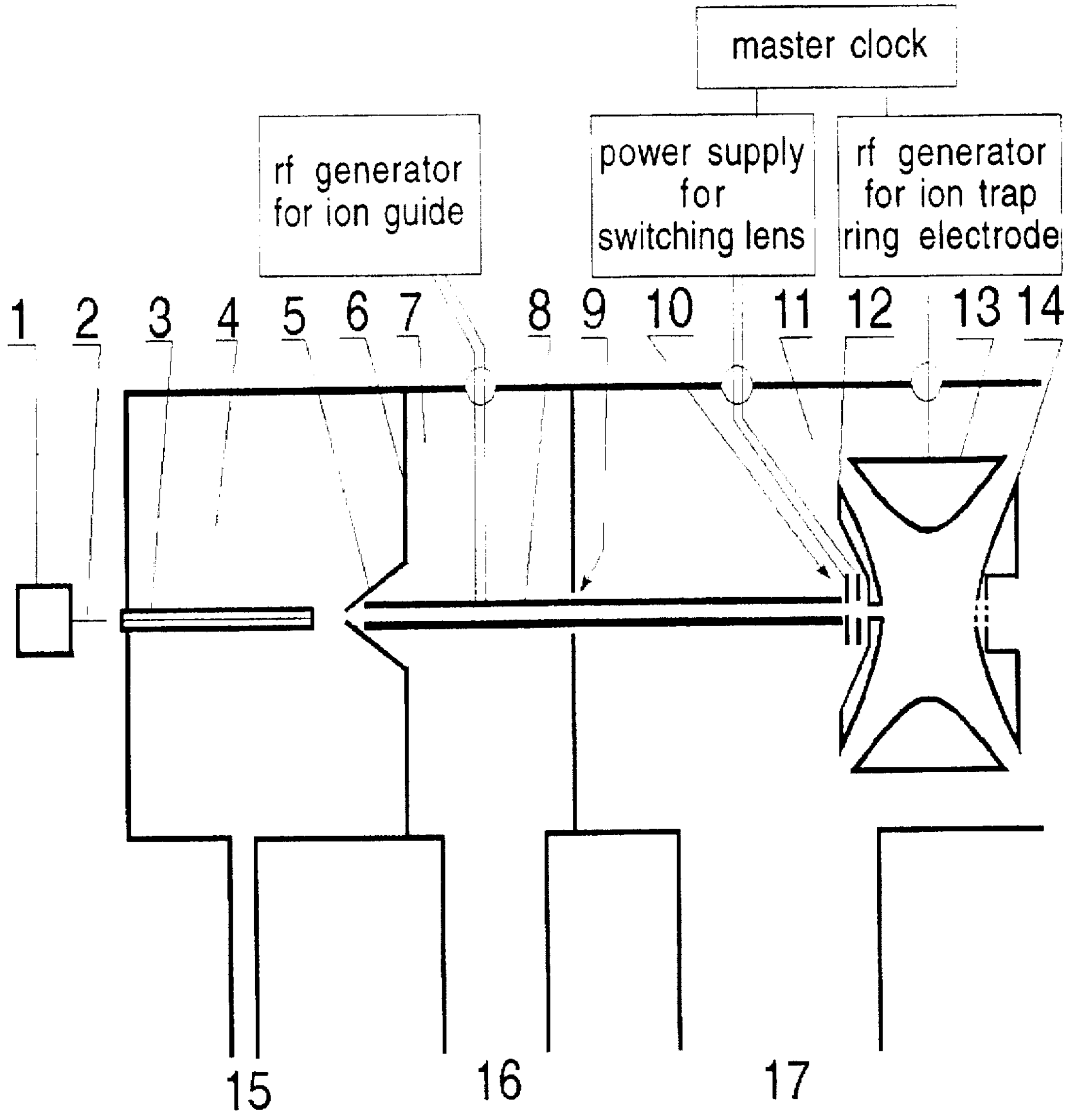
FIG. 5 is a block schematic diagram which illustrates an embodiment of the invention as it relates to an RF quadrupole ion trap made up of two end cap electrodes and a ring electrode.

FIG. 5 shows the switchable ion lens in front of the quadrupole ion trap built into an arrangement made up of a vacuum external electrospray ion source and an ion trap mass spectrometer. The supply tank (1) contains a liquid which is sprayed by electrical voltage between the minute spray capillary (2) and the end surface of the entrance capillary (3). The ions enter the differential first pump chamber (4) which is connected via the connection tube (15) to a fore-pump, through the entrance capillary (3) together with ambient air. The ions are received toward the skimmer (5) and pass through the aperture in the skimmer (5) located in the partition, into the second chamber (7) of the differential evacuation system. This chamber (7) is connected by the pump connection tube (16) with a high vacuum pump. The ions are received by the RF ion guide (8) and led through the wall opening (9) and main vacuum chamber (11) to the end cap (12) of the ion trap. The ion trap consists of two end caps (12, 14) and a ring electrode (13). The main vacuum chamber is connected to a high vacuum pump via the pump connection tube (17).

PARTICULARLY FAVORABLE EMBODIMENTS

The embodiment described here and shown in FIG. 5, relates to an RF quadrupole ion trap made up of two end cap electrodes (12, 14) and a ring electrode (13), which takes the form of a mass spectrometer. The filling of the quadrupole ion trap with ions occurs through a hole in the end cap (12). Application of the invention should however not be solely based on this arrangement alone. For other ways of using the ion trap, an expert can easily make the suitable adjustments.

An ion trap mass spectrometer is generally filled with ions over a time period of 10 microseconds up to a maximum in the range of 100 milliseconds. Then a damping period of several milliseconds follows in which the ions are collected in a small cloud at the center of the ion trap. If a normal mass spectrum is to be scanned, a period then follows in which the ions are ejected from the ion trap mass by mass and measured with measuring apparatus. The ejection generally occurs through the end cap (14) of the ion trap, which faces the injection end cap (12). For other modes of operation, for example MS/MS, further periods of ion isolation and fragmentation are inserted. The filling period is therefore generally brief in comparison to the total of other periods. The ions generated during this time in the ion source were usually discarded before the invention of the RF ion guide with temporary storage and were unusable for analysis. But also during the filling of the quadrupole ion trap, the majority of ions are lost since the capture period is very brief compared with the total RF period. Through this invention, it is possible to save many of these ions from destruction and to use them for analysis.

The embodiment described here is represented with an electron spray ion source (1, 2) outside the vacuum housing of the mass spectrometer. The invention should nevertheless be expressly not limited to this type of ion generation. The ions are obtained in an electrospray ion source (1) through the spraying of fine droplets of a liquid in air (or nitrogen) out of a fine capillary (2) under the influence of a strong electrical field, whereby the droplets vaporize and leave behind their drops on the released molecules of the analysis substance. In this way, very large molecules can be analyzed easily.

The ions from this ion source are usually introduced via a capillary (3) with an inside diameter of about 0.5 millimeters and a length of about 100 millimeters into the vacuum of the mass spectrometer. They are entrained by the simultaneously inflowing air (or by another gas fed to the area around the entrance) through gas friction. A differential pump device with two intermediate stages (4 and 7) handles evacuation of the resulting gas. The ions entering through the capillary are accelerated into the first chamber (4) of the differential pump device within the adiabatically expanding gas jet and pulled by an electrical field toward the opposite opening of a gas skimmer (5). The gas skimmer (5) is a conical tip with a central hole, whereby the exterior cone wall deflects the inflowing gas toward the outside. The opening of the gas skimmer leads the ions, now with much less accompanying gas, into the second chamber (7) of the differential pump device.

Directly behind the opening of the skimmer (5), the ion guide (8) begins. This consists preferably of a linear hexapole arrangement which consists of six thin, straight rods that are uniformly arranged round the circumference of a cylinder. It is however also possible to use a curved ion guide with curved pole rods, to eliminate neutral gas especially well, for example. The rods are provided with an RF voltage, whereby the phase between neighboring rods alternates respectively. The rods are fastened at several points by isolating devices.

The particularly favorable embodiment has 100 millimeter long rods of one millimeter diameter each, the enclosed cylindrical guide space has a diameter of 2.5 millimeters. The ion guide is therefore very slender. Experience shows that the ions which pass through a 1.2 millimeter diameter skimmer hole are accepted by this ion guide practically without loss if their mass is above the cutoff limit. This unusually good acceptance rate is primarily due to the gas dynamic ratios at the input opening.

With a frequency of about 4 megahertz and a voltage of about 300 volts, all simply charged ions with masses above 30 atomic units are focused within the ion guide. Using higher voltages for lower frequencies, the cutoff limit for the ion masses can be raised to any desired value.

The ion guide (8) leads from the opening in the gas skimmer (5), which is arranged as part of the wall (6) between the first (4) and second chamber (7), through the second chamber (7) of the differential pump device, then through a wall opening (9) into the vacuum chamber (11) of the mass spectrometer up to the switchable ion lens (10), located in front of the entrance of the ion trap in the end cap (12). Due to the slender design of the ion guide, the wall opening (9) can be kept very small, so that the pressure difference can be kept favorably large. The first aperture of the switchable ion lens (10) serves as the first ion reflector, while the other ion reflector takes the form of the gas skimmer (5) with its flight hole of 1.2 millimeters diameter.

Quadrupole systems, hexapole systems or other higher multipole systems can be used in the known way as RF ion guides. Even pentapole systems are usable, requiring a five-pole rotational RF voltage for operation, as described in patent application BFA 20/95. Higher uneven rotational pole systems can also be used.

By changing the axis for mid-potential of the ion guide (8) relative to the potential of the skimmer (5) and the first aperture of the switchable ion lens (10), the ion guide (8) can be used as storage for ions of one polarity, meaning either for positive or negative ions. The axis potential is identical to the zero potential of the RF voltage across the RF ion guide. The stored ions constantly run back in force within the ion guide (8). Since they attain a velocity of about 500 to 1,000 meters per second or more during the adiabatic acceleration phase, they first run the length of the ion guide several times per millisecond. Their radial oscillation in the ion guide is dependent upon the injection angle.

Since the ions however periodically return to the second chamber (7) of the differential pump device, in which there is a pressure in excess of $10^{-3}$ millibar, the radial oscillations are very quickly damped, the ions collect along the axis of the ion guide. Even their longitudinal movement is slowed down to thermal velocities. The ions therefore soon possess a thermal velocity distribution upon which nevertheless a common velocity component toward the ion trap (12, 13, 14) is impressed, which comes from the gas current at the entrance.

The ions slowed down to thermal energies fill a fine, thread-shaped area along the axis of the pole system in the RF ion guide (8). They are normally reflected at both ends, at the facing the quadrupole ion trap end, through the ion lens (10). To fill the ion trap, the ion lens is switched to passage, therefore a change in the mid-potential of the ion guide is not necessary.

In the following description, filling is limited to the capture intervals of the ion trap. This limitation is however, in respect to this invention, not absolutely necessary. The limitation of filling to the capture intervals is technically difficult and cannot be done with favorable ion composition ratios.

Before filling the quadrupole ion trap, the potential of the middle lens aperture is adjusted in such a way that the ions are reflected, although they penetrate as far as possible into the ion draw lens. In this way the transfer distance is reduced. At a calculated time before the start of the capture interval, the middle aperture of the ion lens is switched to a high suction potential of several hundred volts. This captures the ions which have penetrated into the lens, and accelerates them toward the aperture of the ion trap. The transfer path into the ion trap should be as short as possible, only about a millimeter if possible. In spite of this, the ions need a finite time in the order of 100 nanoseconds in order to cross the path. Furthermore, this time period is dependent on mass. Opening of the lens must therefore be around this time before the start of the capture interval.

With passage of the ions through the aperture of the end cap (12), they are slowed down by the end cap potential (12). Their energy upon entrance corresponds to the potential difference between the mid-potential of the RF ion guide (8) and that of the end cap (12).

The capture interval for the ions begins about 30 to 50 nanoseconds before the moment of the zero sweep at the second half period of the RF voltage. The ions are then slowed down after their entrance, and are approximately at rest during the zero sweep. They are therefore captured. The phase interval is somewhat dependent on the injection energy, and amounts to about 3 to 5% of the RF period. With the presence of a high pressure collision gas in the quadrupole ion trap, the capture interval is longer, extending to about 15% of the RF period.

With a second opening interval of the ion lens in the second half period, an ion current can be measured at the ion detector, which can be used to control the filling. In a borderline case, the filling interval and measuring interval can be joined to one another in such a way that a single opening interval of longer duration occurs. In this case—but also during separated intervals—it is possible to simply integrate the current of ions at the detector, and to finish the filling process upon attainment of a preselected integrated charge value. It has however proven useful to not have the filling and measuring intervals in the same RF period, since a depletion of the ion supply within the lens volume easily leads to a false reading of the measuring results.

The embodiment described here is based on ions formed outside the vacuum. Of course ion sources which are located within the vacuum housing of the mass spectrometer could also be joined to ion traps via storage ion guides.

The RF quadrupole ion traps need not necessarily take the form of the mass spectrometer themselves. They could, for example, serve to collect ions for time-of-flight spectrometers, to concentrate them into a dense cloud, and then outpulse them into the flight path of the time-of-flight spectrometer. It is therefore also possible to isolate or also to fragment certain desirable ions within the ion trap first in the usual way before outpulsing, thereby allowing MS/MS measurements in time-of-flight spectrometers. The advantage of time-of-flight spectrometers lies in their great mass range and rapid scanning.

We claim:

1. Method for the transfer of ions from a storage RF ion guide into a quadrupole ion trap, which is operated by an RF driving voltage, wherein a switchable ion lens is arranged between RF ion guide and quadrupole ion trap, consisting of a first aperture diaphragm at the end of the RF ion guide, a second aperture diaphragm, and an aperture in the injection end cap of the quadrupole ion trap, and wherein the lens can be switched to ion passage for filling of the quadrupole trap and otherwise to ion reflection.

2. Method as in claim 1, wherein the first aperture diaphragm is at a potential which reflects the ions stored in the RF ion guide, and wherein the voltage of the second aperture can be switched between two potentials, one of which causes passage of the ions, while the other supports the reflection of the first aperture.

3. Method as in claim 1, wherein the ion lens can be switched so quickly that it can be switched to passage for a brief filling interval within a period of RF voltage for the quadrupole ion trap.

4. Method as in claim 3, wherein the filling interval can be adjusted to a time period of 2 to 15% of the RF period.

5. Method as in claim 3, wherein the start phase for the filling interval can be adjusted relative to the phase of the RF voltage for the quadrupole ion trap.

6. Method as in claim 3, wherein the duration of the filling interval is limited to the duration of the capture interval of the quadrupole ion trap.

7. Method as in claim 3, wherein the capture interval is broadened by the pulsed supply of collision gas.

8. Method as in claim 3, wherein a filling interval occurs in every RF period.

9. Method as in claim 3, wherein the falling interval occurs only in selected RF periods, for limitation of the filling rate.

10. Method as in claim 3, wherein the ion lens is opened for measurement of the filling rate in a measuring interval which occurs during the ion trap passage interval of the RF period of the quadrupole ion trap.

11. Method as in claim 10, wherein the measurement interval and filling interval occur alternately in sequential RF periods of the quadrupole trap.

12. Method as in claim 10, wherein the measurements of the filling rate are used to control optimal filling.

13. Method as in claim 10, wherein the filling degree of the storage ion guide and also the optimum filling time for the ion trap is determined by a rapid trial filling with subsequent integral measurement of ions in the ion trap.

14. Device consisting of a quadrupole ion trap with voltage supply, an RF ion guide with voltage supply, and a switchable ion lens made up of three coaxial aperture diaphragms with voltage supply, wherein the ion lens is arranged at the end of RF ion guide and the injection end cap forms the third aperture diaphragm of the lens.

15. Device as in claim 14, wherein the voltage supply for the switching of the ion lens has a rise time of at least 1,000 volts per microsecond.

16. Device as in claim 14, wherein the voltage supply of the ion lens and the ion supply of the quadrupole ion trap are controlled in such a way that the switching of the ion lens can occur synchronous to the period of RF voltage.

17. Device as in claim 14, wherein the switching of the ion lens is adjustable according to phase and duration.

* * * * *